United States Patent [19]

Aono

[11] 4,365,845
[45] Dec. 28, 1982

[54] HYDRAULIC BRAKE PRESSURE CONTROL VALVE

[75] Inventor: Masami Aono, Yokohama, Japan

[73] Assignee: Tokico Ltd., Kawasaki, Japan

[21] Appl. No.: 308,174

[22] Filed: Oct. 2, 1981

Related U.S. Application Data

[63] Continuation of Ser. No. 87,298, Oct. 22, 1979, abandoned.

[30] Foreign Application Priority Data

Oct. 20, 1978 [JP] Japan .............................. 53-144213

[51] Int. Cl.$^3$ .............................................. B60T 8/26
[52] U.S. Cl. .................................................... 303/6 C
[58] Field of Search .............. 188/349; 303/6 C, 22 R

[56] References Cited

U.S. PATENT DOCUMENTS 3,976,334  8/1976  Farr ................................... 303/6 C Primary Examiner—Duane A. Reger
Attorney, Agent, or Firm—Wenderoth, Lind & Ponack

[57] ABSTRACT

A hydraulic brake pressure control valve including a housing provided with a first inlet connected to a source of hydraulic pressure, an outlet connected to a wheel brake cylinder, and a second inlet connected to a source of hydraulic pressure, a valve piston slidably disposed in the housing and having therethrough a passage connecting the first inlet and the outlet, a valve seat formed on one end of the passage, a valve body having a valve portion cooperating with the valve seat and being provided in a bore portion of the housing communicating with the first inlet, and an actuating piston slidably disposed in the housing and receiving the pressure in the second inlet to urge the valve piston toward the first inlet. The valve body is slidably mounted in the housing and is retained at a predetermined position by a spring and is retractable when the pressure in the first inlet exceeds a predetermined high pressure.

2 Claims, 2 Drawing Figures

HYDRAULIC BRAKE PRESSURE CONTROL VALVE

This is a continuation of application Ser. No. 87,298, filed Oct. 22, 1979, now abandoned.

BACKGROUND OF THE INVENTION

This invention relates to hydraulic brake pressure control valves adapted for use in vehicle braking systems.

Various types of hydraulic brake pressure control valves have been proposed and utilized for controlling the brake pressure in rear wheel brakes as compared with that in front wheel brakes such that the brake pressure in the rear wheel brakes is limited to a predetermined pressure or that the brake pressure in the rear wheel brakes is reduced as compared with the front wheel brakes in the higher ranges of applied brake pressure. Such valves can effectively avoid premature rear wheel skidding.

However, in vehicles such as trucks or the like, the skidding condition in the rear wheel brakes varies substantially between the light-loaded condition and the heavy loaded condition, and a hydraulic brake pressure control valve adjusted for the light-loaded condition cannot supply the pressure required to effectively stop the vehicle in the heavy-loaded condition. Thus, there have been proposed load-responsive type hydraulic pressure control valves. However, there are shortcomings in such valves, for example that the construction is complicated, and the adjustment during installation of the valves is difficult since some of them have external links or the like connecting the valves with load detecting means or the like.

SUMMARY OF THE INVENTION

An important object of the present invention is to provide a simple brake pressure control valve eliminating the above described shortcomings and according to the invention, the hydraulic pressure supplied to rear wheel brakes is controlled such that the pressure increases at a reduced rate as compared with the pressure supplied to front wheel brakes between predetermined first and second pressure levels to avoid skidding in the light-loaded condition, and when the pressure supplied to the front wheel brakes exceeds the second pressure level the pressure supplied to the rear wheel brakes approaches the pressure supplied to the front wheel brakes whereby a heavy braking force can be applied to the rear wheel brakes in the heavy loaded condition or in case of emergency.

The hydraulic brake pressure control valve according to the invention comprises a housing having a first inlet and outlet connected to a first pressure circuit and a second inlet preferably connected to a second pressure circuit, a valve piston slidably disposed in the housing and having therethrough a passage connecting the first inlet and outlet, an actuating piston receiving the pressure in the second inlet and abutting the valve piston through a rod to urge the valve piston toward the first inlet, a valve seat formed at one end of the passage opening to the first inlet, a valve body cooperating with the valve piston for opening or closing the passage, a bore formed in the housing for slidably receiving the valve body with one end opening to the atmosphere and the other end being exposed to the pressure in the first inlet, and a spring urging the valve body toward the valve seat.

BRIEF DESCRIPTION OF THE DRAWINGS

Other objects and advantages of the invention will become apparent from the following description taken in conjunction with the accompanying drawings, in which.

DETAILED DESCRIPTION OF THE PREFERRED EMBODIMENTS

Figure 1:
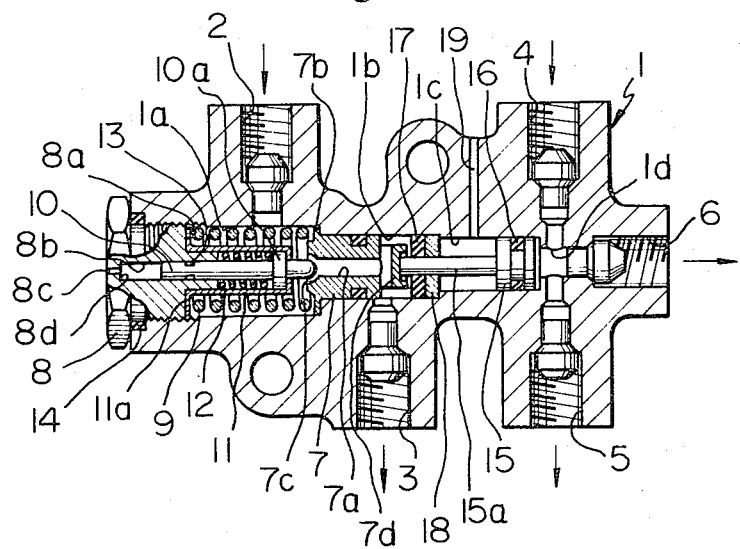
FIG. 1 is a longitudinal section of a hydraulic pressure control valve according to the invention.

The hydraulic brake pressure control valve illustrated in FIG. 1 comprises a housing or main body 1 having a longitudinally extending stepped bore which consists of a bore portion 1a, cylinder portions 1b and 1c, and a bore portion 1d in order from left to right as viewed in the drawing the diameters of which are sequentially decreased. The housing 1 is further provided with a first inlet 2 opening into the bore portion 1a, a first outlet 3 communicating with the cylinder portion 1b, and a second inlet 4 and outlets 5 and 6 communicating with the bore portion 1d respectively. Preferably, the first inlet and outlet 2 and 3 are connected to a first pressure circuit. More particularly, the first inlet 2 is connected to a first outlet of a dual type master cylinder (not shown) and the outlet 3 is connected to rear wheel brake cylinders of a vehicle (not shown). The second inlet 4 is connected to a second outlet of the master cylinder, and outlets 5 and 6 are connected respectively to front wheel brake cylinders (not shown) of the vehicle.

A valve piston 7 is slidingly disposed in the cylinder portion 1b and has therethrough a passage 7a through which the inlet 2 and the outlet 3 are in communication. A pressure control spring 9 is provided in the bore portion 1a and between the valve piston 7 and a plug 8 closing the left end or the open end of the bore portion 1a. Thus, the valve piston 7 is biassed rightwards by the spring 9 such that, in the unactuated condition shown in the drawing, a flange like projection or stop 7b of the valve piston 7 abuts a shoulder defined at the step between the bore portion 1a and the cylinder portion 1b.

A valve seat 7c is formed on the left end of the passage 7a of the valve piston 7 for cooperating with a valve body 10 to permit or block the communication between the inlet 2 and outlet 3. The valve body 10 is normally retained at a predetermined position in the bore portion 1a by a generally hat shaped retainer 11. The retainer 11 has a flange portion 11a being clamped between the plug 8 and the pressure control spring 9.

The left end portion of the valve body 10 is slidingly and sealingly received in a bore 8b of the plug 8. A spring 12 acts between a projecting inner end 8a of the plug 8 and a flange portion 10a of the valve body 10 which is provided near the right end portion of the valve body so that the flange portion 10a of the valve body 10 is normally urged against the retainer 11 thereby locating the valve body 10 at the predetermined position. The left end of the bore 8b is permanently in communication with the atmosphere through a small hole 8c. The spring force of the spring 12 is such that the valve body 10 moves leftward when the pressure in the inlet 2 exceeds a predetermined high pressure which will be explained later. Shown at 13 is a seal member sealing the valve body 10 in sliding engagement in bore 8b and, at 14 is a seal ring provided between the outer end of the bore portion 1a and the plug 8.

An actuating piston 15 is slidingly received in the cylinder portion 1c of the housing 1 which receives the hydraulic pressure from the second inlet 4 to cause it to move leftward. The actuating piston 15 acts on the valve piston 7 through a rod 15a which is preferably formed integrally with the actuating piston 15 and having a diameter smaller than the actuating piston 15. The left end of the cylinder portion 1c is exposed to the atmosphere through an opening 19. A seal ring 16 seals the actuating piston 15, and a seal ring 17 retained by an annular retainer 18 on the rod 15a is in sliding sealing engagement with the cylinder 1b.

Figure 2:
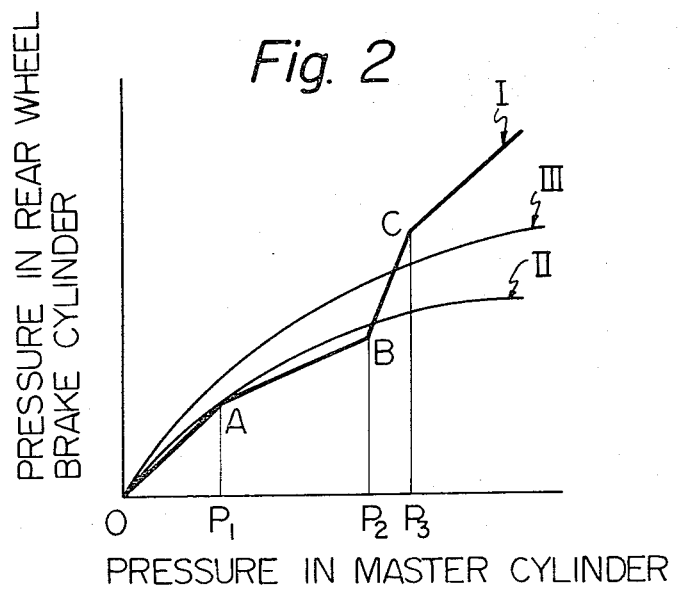
FIG. 2 is a diagram showing the relationship between the pressure supplied to rear wheel brakes and the pressure in the master cylinder according to the invention (polygonal line I) and ideal characteristic curves (curves II and III).

Now the operation of the brake pressure control valve will be described. For applying the brake, a brake pedal (not shown) is depressed to actuate the master cylinder, and, hydraulic pressure is supplied through the inlet 2, the passage 7a in the valve piston 7 and the outlet 3 too rear wheel brake cylinders, and also supplied through the inlet 4, the bore portion 1d, and the outlets 5 and 6 to the front wheel brake cylinders. The actuating piston 15 has exerted thereon the pressure in the bore portion 1d which moves the valve piston 7 leftwards against the spring force of the pressure control spring 9. The pressure supplied to the rear wheel brake cylinders is the inlet pressure or the pressure delivered by the master cylinder, and such condition is depicted by line OA in FIG. 2. When the pressure in the inlets 2 and 4 increases to a predetermined pressure $P_1$ (FIG. 2) the valve piston 7 engages with the valve body 10 thereby blocking the communication between the inlet 2 and the outlet 3. Thereafter, the valve piston 7 repeatingly moves right and left with respect to the valve body 10, which is stationary in that condition, in response to the increase in the pressure in the inlets 2 and 4 whereby the pressure at the outlet 3 increases at a reduced rate. The pressure in the outlet 3 is depicted at line AB in FIG. 2. The characteristic curve is particularly adapted for the condition when the vehicle is in light-loaded condition, and the curve II in FIG. 2 depicts an ideal curve for stopping the vehicle in such light-loaded condition.

When the vehicle is in a heavy-loaded condition, the brake pressure supplied to rear wheel brake cylinders can be increased without generating a skidding phenomenon. According to the invention, the valve body 10 starts to retract into the cylinder portion 8b of the plug 8 against the action of the spring 12 when the pressure in the inlet 2 exceeds a predetermined high pressure $P_2$. Thus, the pressure at the outlet 3 increases along line BC in FIG. 2. It will be noted that the valve piston 7 follows the movement of the valve body 10 and that the spring force of the spring 12 increases in response to the leftward movement of the valve body 10. When the pressure at the inlets 2 and 4 exceeds a predetermined pressure $P_3$, the valve body 10 engages with the inner end surface 8d of the cylinder portion 8b and the valve body 10 opens the passage 7a in the valve piston 7, and thus, the pressure supplied to rear wheel brake cylinders is equal to the pressure in the master cylinder. Therefore, it is possible to apply a heavy braking effort to rear wheel brake cylinders when the vehicle is in a heavy-loaded condition or in case of an emergency, and when the vehicle is in a light-loaded condition the pressure supplied to rear wheel brake cylinders is controlled such that the rate of the increase thereof is small as compared with the pressure supplied to front wheel brake cylinders thereby avoiding premature rear wheel skidding.

In the disclosed embodiment, the inlet 4 and outlets 5 and 6 are connected to a second pressure circuit. However, the invention is not limited to the particular form of this embodiment. For example, the inlet 4 may be branched from the inlet 2, or the outlets 5 and 6 may be branched from a line connected to the inlet 2.

As described heretofore, the hydraulic brake pressure control valve according to the invention can effectively avoid premature rear wheel skidding when the vehicle is in a light-loaded condition and makes it possible to apply to heavy braking effort when the vehicle is in a heavy-loaded condition or in case of an emergency thereby substantially increasing the safety of the vehicle.

What is claimed is:

1. A hydraulic brake pressure control valve comprising:
    a housing having a first inlet for being supplied with hydraulic pressure fluid under pressure and a first outlet and a second inlet for being supplied with hydraulic pressure fluid under pressure;
    a valve piston slidably disposed in said housing and having a passage therethrough connecting said first inlet and said first outlet;
    an actuating piston slidably disposed in said housing for being acted on by the hydraulic pressure fluid from said second inlet and having a rod extending therefrom and abutting said valve piston for urging the valve piston toward said first inlet under the pressure of the hydraulic pressure fluid acting on said actuating piston;
    a first spring urging said valve piston toward said actuating piston and preventing movement of said valve piston at pressures less than a pressure $P_1$;
    a valve seat on said valve piston at the end of the passage opening toward said first inlet;
    said housing further having a bore therein, one end of said bore opening to the atmosphere and the other end being exposed to the pressure of the hydraulic pressure fluid from said inlet;
    a valve body being slidably and sealingly mounted in said bore and projecting out of the other end of said bore and cooperating with said valve seat;
    a second spring engaged with said valve body and urging said valve body toward said valve seat and preventing movement of said valve body at pressures less than pressure $P_2$ which is greater than pressure $P_1$; and
    a retainer normally retaining said valve body at a predetermined position in the housing.

2. A hydraulic brake pressure control valve as claimed in claim 1 wherein the diameter of said actuating piston is greater than that of said rod.

* * * * *